(12) United States Patent
Tan et al.

(10) Patent No.: US 7,114,939 B2
(45) Date of Patent: Oct. 3, 2006

(54) ENCAPSULATING BRITTLE SUBSTRATES USING TRANSFER MOLDING

(75) Inventors: Cheng Why Tan, Penang (MY); Beng Huat Low, Penang (MY); Huck Khim Koay, Penang (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 96 days.

(21) Appl. No.: 10/370,006

(22) Filed: Feb. 20, 2003

(65) Prior Publication Data

US 2003/0194459 A1   Oct. 16, 2003

(30) Foreign Application Priority Data

Apr. 11, 2002  (MY) .............................. PI20021337

(51) Int. Cl.
*B29C 45/14* (2006.01)
*H01L 21/56* (2006.01)
(52) U.S. Cl. ..................................... 425/127; 425/129.1
(58) Field of Classification Search ................ 425/116, 425/117, 125, 127, 129.1
See application file for complete search history.

(56) References Cited

U.S. PATENT DOCUMENTS

| | | | | |
|---|---|---|---|---|
| 4,575,328 | A | * | 3/1986 | Fierkens et al. .......... 425/126.1 |
| 4,954,308 | A | * | 9/1990 | Yabe et al. ............. 264/272.17 |
| 5,218,759 | A | * | 6/1993 | Juskey et al. .................. 29/840 |
| 5,971,734 | A | * | 10/1999 | Moon .......................... 425/127 |
| 6,019,588 | A | * | 2/2000 | Peters et al. ................. 425/125 |
| 6,081,997 | A | * | 7/2000 | Chia et al. ..................... 29/841 |
| 6,200,121 | B1 | * | 3/2001 | Tsuruta ....................... 425/127 |
| 6,258,314 | B1 | * | 7/2001 | Oida et al. .................. 264/511 |
| 6,712,594 | B1 | * | 3/2004 | Saito et al. .................. 425/127 |

* cited by examiner

*Primary Examiner*—Robert B. Davis

(57) ABSTRACT

A transfer molding arrangement for encapsulating a substrate with an encapsulating material comprising a bottom mold and a top mold, wherein a space is provided between the top mold and bottom mold for receiving the substrate, and the top mold and/or the bottom mold is/are arranged in such a way that when a clamping force is applied sufficiently strong, the top mold and bottom mold are abutted against each other, thereby distributing the force exerted on the substrate to the top mold and bottom mold.

11 Claims, 4 Drawing Sheets

ENCAPSULATING BRITTLE SUBSTRATES USING TRANSFER MOLDING

BACKGROUND OF THE INVENTION

Encapsulation of substrates containing IC chips and other electronic circuitries is important for providing environmental protection and heat dissipation for the circuits on the substrates. Different methods of encapsulation are provided for the circuits on the substrates, depending on the types of substrates used and the environmental conditions the electronic circuits on the substrate are to operate under.

There are in general two types of encapsulation methods, namely the open-form encapsulation and the chamber encapsulation.

An example of the open-form encapsulation is the so called "dam and fill" method. According to this method, a damming epoxy of very low viscosity is formed around circuits on the substrate. A potting epoxy of a higher viscosity is dispensed into the region surrounded by the damming epoxy to flood the entire substrate. After the potting epoxy is hardened, the damming epoxy and the region outside are sawn off, leaving the encapsulated substrate. This method is slow and the costs of encapsulation per substrate unit are very high. There is also high wastage of material due to the sawing off of the damming epoxy. Further, this method has very poor encapsulating material thickness control.

An improvement to the "dam and fill" method is the screen-printing method. According to the screen-printing method, a stencil is used to cover the areas of the substrate that are not supposed to be encapsulated, and a screen print machine coats a layer of encapsulating material over the entire surface of the substrate. The printing process continues until the desired thickness of the encapsulation layer is reached. This method is faster and has lower substrate unit costs compared to the "dam and fill" method. However, the sweeping motion of the encapsulating material due to the sweeping action of the printer can cause disturbed wire problems of the circuits on the substrate. Furthermore, this method is limited to encapsulating one or two pieces of substrates at one time.

Transfer molding is a form of chamber encapsulation which provides excellent thickness control. Using transfer molding, multiple pieces of substrates can be encapsulated at one time and the substrate unit costs of encapsulating a substrate unit are low. This process is also very fast compared to the methods described above. According to this method, generally a top mold 101 with a rectangular cavity 104 is placed onto a substrate 100 which is supported by a bottom mold 102 under the substrate 100 as shown in FIG. 1. Clamps 103 are used to hold the top mold 101, the substrate 100 and the bottom mold 102 together. Encapsulating material is injected through openings 105 arranged in the top mold 101 into the cavity 104 enclosed by the top mold 101 and the substrate 100. The clamps 103 and the top mold 101 are subsequently removed and the encapsulating material on the substrate is cured so that it is hardened to form the desired encapsulation.

It is advantageous to use ceramic substrates since they offer smaller line and space features of the electronic circuitries, and hence smaller form factor packages especially for mobile applications. They also provide better thermal conductivity compared to organic substrates.

However, ceramic substrates are very brittle and would thus break very easily due to the application of the clamping force during the process of encapsulating the substrate using the transfer molding technique.

Therefore, nowadays, ceramic substrates are encapsulated only by using the open-form method, in particular using the "dam and fill" method.

SUMMARY OF THE INVENTION

It is thus an object of the invention to provide a transfer molding arrangement for encapsulating a substrate, in particular a brittle substrate, with an encapsulating material using the transfer molding technique, in such a way that a clamping force effecting onto the substrate during the process of transfer molding due to a clamping of the substrate with the top mold and a bottom mold is reduced.

According to the invention, a transfer molding arrangement for encapsulating a substrate with an encapsulating material is provided, comprising a bottom mold and a top mold, wherein a space is provided between the top and bottom mold for receiving the susbtrate, and the top mold and/or the bottom mold are arranged in such a way that when a clamping force is applied sufficiently strong, the top mold and the bottom mold are abutted against each other, thereby distributing the force exerted on the substrate to the top and bottom mold.

The force exerted on the substrate according to the invention is limited by the amount the substrate protrudes from the space between the top mold and bottom mold. The force exerted on the substrate is at maximum when the top mold is abutted against the bottom mold. Any further force exerted by the clamps to the top and bottom mold when the two molds are abutted against each other is distributed to the molds, and therefore will not exert further force on the substrate.

The space between the top mold and the bottom mold for receiving the substrate is usually provided by a recess in either the top mold and/or the bottom mold. Grinding and Electronic Discharge Machining (EDM) are usually used to create the recess in the top mold and/or the bottom mold. In the EDM method, an electrode is attached to the EDM machine and the unwanted material on the mold is electronically sparked off. A plurality of shapes can be created using the EDM method. Grinding is usually used to achieve a high precision depth and good smoothness of the recess. Since the grinding machine creates the recess in the mold using a back and forth motion, a channel is created by the grinding method.

According to the preferred embodiment of the invention, a bottom mold which comprises a recess is used in the transfer molding arrangement. Therefore, the space between the top mold and the bottom mold for receiving the substrate is provided by the recess in the bottom mold, wherein the substrate to be encapsulated is fitted at least partially into the recess. The depth of the recess is designed to be slightly smaller than the thickness of the substrate and therefore, the substrate extends slightly over the recess of the bottom mold when the substrate is accommodated in the recess.

According to a further preferred embodiment of the invention, the recess of the bottom mold has a shape of a channel extending along the bottom mold. The substrate to be encapsulated is placed into the channel provided in the bottom mold and the top mold is placed over the substrate and the bottom mold. Using the shape of a channel as the recess for the bottom mold has the advantage of allowing substrates of different widths or lengths to be encapsulated using the same bottom mold. Further, the channel can be formed using the grinding method, generating a recess of high precision depth and good smoothness. It should be noted that the recess on the bottom mold may take the shape of a rectangular cavity.

According to another embodiment of the invention, a top mold which comprises a stepped cavity is used for providing the space between the top and bottom mold for receiving the substrate. The stepped cavity of the top mold comprises a first region for receiving the encapsulating material, a second region for receiving the substrate to be encapsulated and at least one opening for injecting the encapsulating material into the first region.

The first region of the cavity is smaller than the second region of the cavity, in other words, the cross section of the first region's main surface is smaller than the cross section of the second region's main surface. The substrate to be encapsulated is at least partially fitted into the second region of the cavity. The length of the protrusion forming the second region of the cavity is preferably designed to be slightly shorter than the thickness of the substrate and therefore, the substrate extends slightly over the second region of the cavity of the top mold when the substrate is accommodated in the second region of the cavity. The substrate and the top mold are placed on the bottom mold, with the substrate fitting into the second region of the top mold. Clamping force is applied to the top and bottom mold until the two molds are abutted against each other, thereby distributing the force exerted on the substrate by the clamping force to the top and bottom molds.

The method according to the invention allows a brittle substrate, in particular a ceramic substrate, to be encapsulated using the advantageous transfer molding technique, which is not possible using a method according to the state of the art, thereby providing an easy and cheap encapsulation technique even for a brittle substrate.

In another aspect of the invention, a transfer molding bottom mold for encapsulating a substrate with an encapsulating material is provided, wherein the transfer molding bottom mold comprises a recess for receiving the substrate. The recess may have the shape of a channel or a rectangular cavity.

In another aspect of the invention, a transfer molding top mold for encapsulating a substrate with an encapsulating material, wherein the transfer molding top mold has a stepped cavity comprising a first region for receiving the encapsulating material, a second region for receiving the subtrate and at least one opening for injecting the encapsulating material into the first region of the stepped cavity when the substrate is received in the second region.

In another aspect of the invention, an arrangement for encapsulating a substrate with an encapsulating material, comprising a bottom mold and a top mold, wherein a space is provided between the top and bottom mold for receiving the substrate, a first placing unit for placing the substrate onto the bottom mold, a second placing unit for placing the top mold onto the substrate, thereby fitting the substrate at least partially into the space between the top and bottom mold, a clamping unit for clamping the top and bottom mold sufficiently strong towards each, wherein the top mold and/or the bottom mold are arranged in such a way that when a clamping force is applied sufficiently strong to the top mold and/or the bottom mold, the top mold and bottom mold are abutted against each other, thereby distributing the force exerted on the substrate to the top mold and bottom mold, an injecting unit for injecting the encapsulating material into a cavity in the top mold through at least one opening, and a curing unit for curing the encapsulating material, thereby encapsulating the substrate.

The above and other objects, features and advantages of the invention will become apparent from the following description and the appended claims, taken in conjunction with the accompanying drawings in which like parts or elements are denoted by like reference signs.

BRIEF DESCRIPTIONS OF THE DRAWINGS

DETAILED DESCRIPTION OF THE PREFERRED EMBODIMENT OF THE INVENTION

A preferred embodiment of the invention will now be described in detail with reference to the attached drawings.

Figure 1:
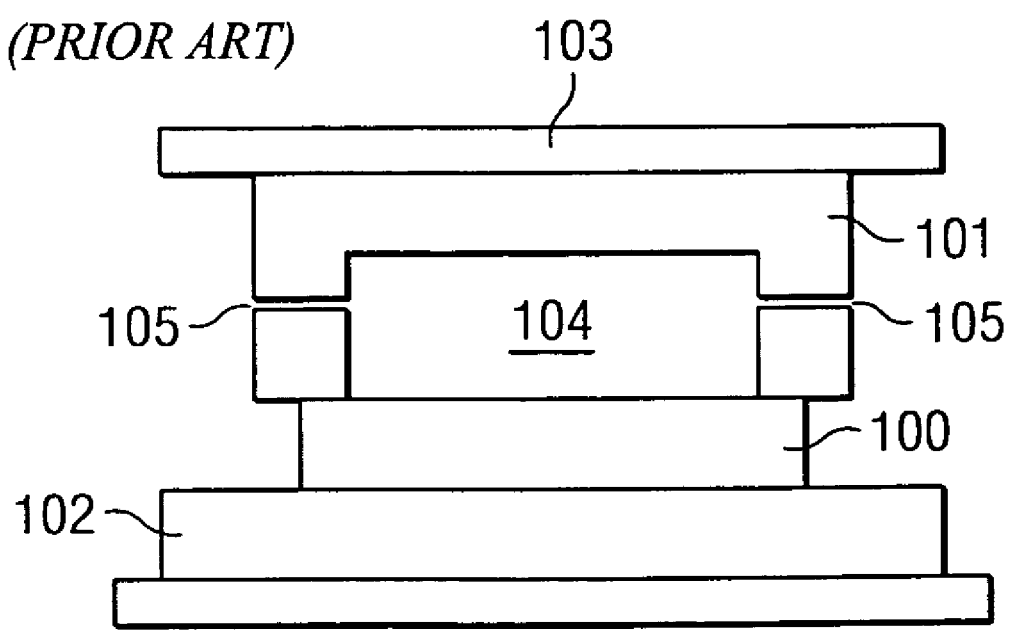
FIG. 1 shows the arrangement for transfer molding according to the state of the art.
Figure 2:
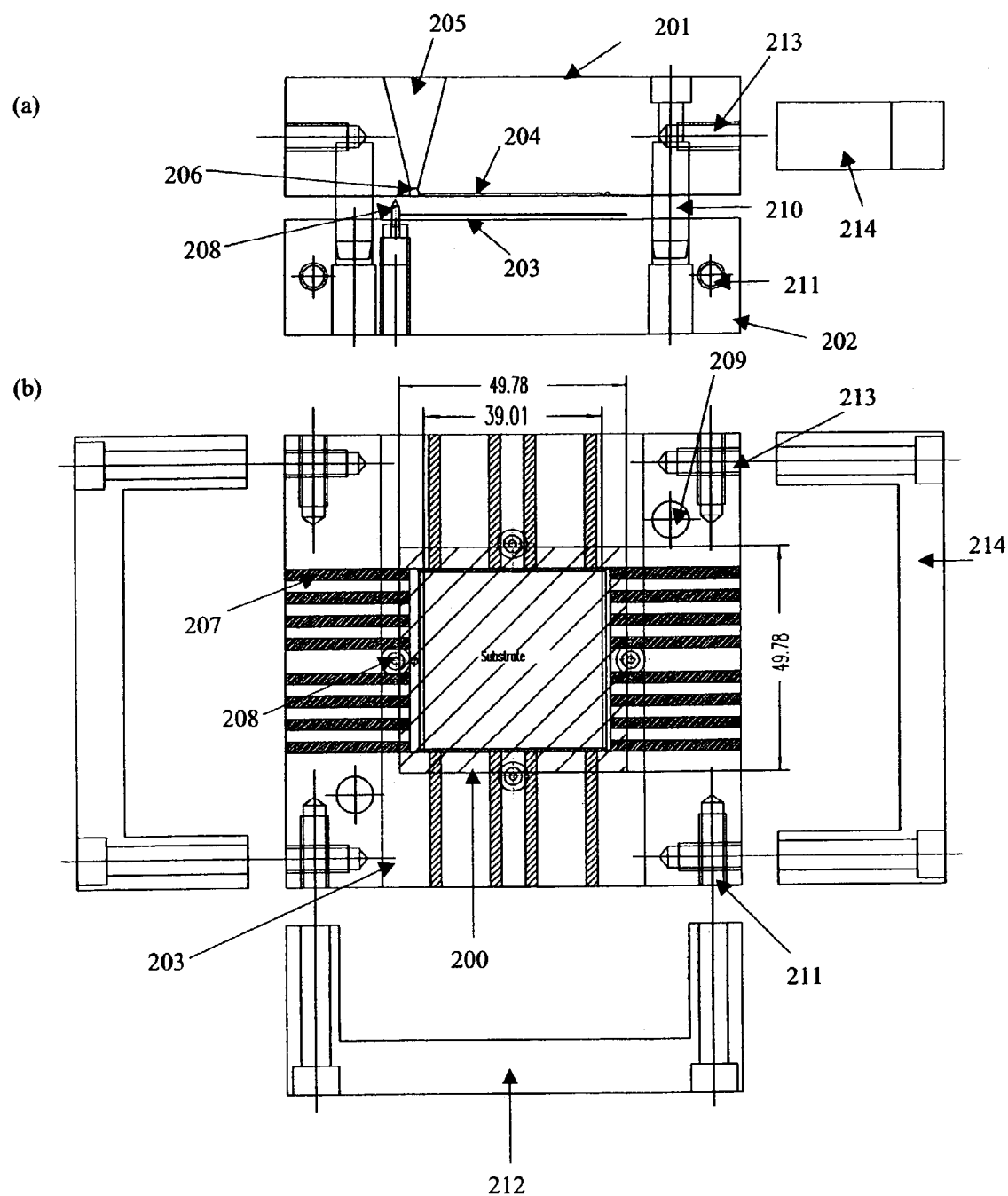
FIG. 2(a) shows the front view of the arrangement for the transfer molding wherein a bottom mold with a recess is used according to the preferred embodiment of the invention.
FIG. 2(b) shows the plan view of the arrangement for the transfer molidng wherein a bottom mold with a recess is used according to the preferred embodiment of the invention.

A transfer molding top mold 201 and bottom mold 202 according to the preferred embodiment of the invention is shown in FIG. 2(a) and FIG. 2(b). The bottom mold 202 has a recess in a form of a channel 203 extending across the bottom mold 202. A substrate 200 is fitted on the channel 203 between four locating pins 208. The top mold 201 has a cavity 204 to receive encapsulating material from a reservoir 206, and the encapsulating material is injected into the reservoir 206 through an encapsulant inlet 205. A plurality of air vents 207 are provided to the cavity 204 to allow any excess air and encapsulant material to flow out. The position of the top mold 201 on the bottom mold 202 is guided by at least one pilot pin 210 from the top mold 201 into the pilot pin relief hole 209 of the bottom mold 202. A plurality of handles 214 are attached to the top mold 201 via a plurality of screw holes 213 at the sides of the top mold 201. Similarly, a plurality of handles 212 are attached to the bottom mold 202 via a plurality of screw holes 211 at the sides of the bottom mold 202.

According to another embodiment of the invention, the recess of the bottom mold is a rectangular cavity, wherein a substrate to be encapsulated is fitted into the cavity of the bottom mold, with the substrate protruding slightly over the cavity of the bottom mold.

During the encapsulation process, the ceramic substrate 200 containing electronic circuits to be encapsulated is placed between the locating pins 208 on the channel 203 of the bottom mold 202 by a first placing unit (not shown). It should be noted that the invention is not limited to ceramic substrates. Any substrates may be used within the scope of the invention. The top mold 201 is placed onto the substrate 200 by a second placing unit (not shown), guided by the pilot pins 210 of the top mold 201, with the cavity 204 of the top mold 201 directly above the area of the substrate 200 to be encapsulated. It should be noted that the first placing unit and the second placing unit may be the same placing unit or different placing units.

The depth of the channel 203 of the bottom mold 202 is designed to be shorter than the thickness of the substrate 200 with regard to the main surface of the substrate 200. Therefore, the substrate 200 protrudes from the channel 203 of the bottom mold 202 by an amount which is equal to the difference between the thickness of the substrate 200 and the depth of the channel 203. According to the preferred embodiment of the invention, the substrate 200 protrudes from the channel 203 by approximately three percent of the thickness of the substrate 200 when the substrate 200 is fitted on the channel 203. In particular, for the substrate 200 having a thickness between 130 micrometer and 170 micrometer, the length of the protrusion is designed such that the substrate 200 protrudes from the channel 203 of the bottom mold by about 3.9 micrometer to 5.1 micrometer. In other words, the depth of the channel 203 preferably varies between 126.1 micrometer and 164.9 micrometer, respectively.

The top mold 201, the substrate 200 and the bottom mold 202 are clamped together using a clamping unit (not shown). According to the preferred embodiment of the invention, the clamps are applied from the top and bottom of the top mold 201 and the bottom mold 202 with regard to the main surface of the substrate 200, respectively, pressing the two molds towards each other. The clamping force is increased and the substrate 200 is thus compressed until the top mold 201 and the bottom mold 202 are abutted against each other. At this stage, the substrate 200 is compressed until the thickness of the compressed substrate 200 is the same as the depth of the channel 203 of the bottom mold 202. When the force applied by the clamps continues to increase after the top mold 201 and the bottom mold 202 are abutted against each other, the increased force applied by the clamps will only be exerted onto the top mold 201 and the bottom mold 202 and not onto the substrate 200.

Therefore, the substrate 200 will not break even though the clamping force exerted by the clamps are greater than required and, according to the state of the art, might break the brittle ceramic substrate.

According to another embodiment of the invention, a compliance material being deposited onto the inner surface of the channel 203 to further absorb the clamping force exerted on the substrate 200 by the clamps when a thicker substrate is to be encapsulated.

After the top mold 201, the substrate 200 and the bottom mold 202 have been clamped together, encapsulating material is injected into the cavity 204 of the top mold 201 through the encapsulant inlet 205 by an injecting unit for injecting an encapsulating material into the cavity 204 of the top mold 201. The encapsulating material used for the encapsulation is usually a black overmold compound. After the encapsulating material has settled in the entire cavity 204 of the top mold 201, the clamps and the top mold 201 are removed by a removing unit (not shown) for removing the clamps and the top mold 201 from the bottom mold 202 and the substrate 200, and the encapsulating material is cured so that it is hardened using a curing unit for curing the encapsulating material (not shown), and the encapsulation process of the substrate 200 is complete.

According to another embodiment of the invention, a top mold with a plurality of cavities and a bottom mold with a plurality of channels are used to encapsulate a plurality of substrates at the same time. According to this embodiment, a plurality of substrates are placed on the plurality of channels of the bottom mold, and the top mold with a plurality of cavities are placed on the substrates, such that each area of the substrate to be encapsulated is under a respective cavity of the top mold. The top mold, the substrates and the bottom mold are then clamped together and the encapsulating material is injected into a respective cavity of the top mold. The clamps and the top mold are removed and all the encapsulating materials on each substrate are cured. Thus, a plurality of substrates are encapsulated with the encapsulating material at the same time.

Figure 3:
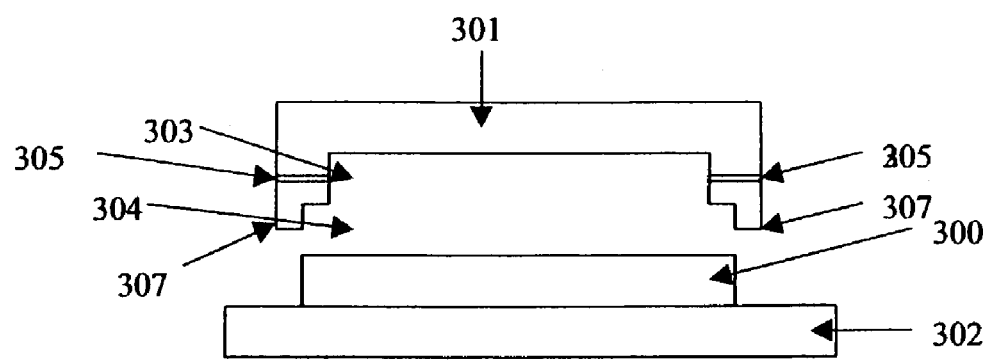
FIG. 3 shows the arrangement for the transfer molding wherein a top mold with a stepped cavity is used according to an embodiment of the invention.

According to another embodiment of the invention, a top mold 301 comprises a rectangular shape, stepped cavity as shown in FIG. 3 is used. By the step, the stepped cavity is divided into two regions; a first region 303 having a first region main surface and a second region 304 having a second region main surface, wherein the first region main surface has a smaller cross section than the second region main surface. With reference to the orientation of the top mold 301 as shown in FIG. 3, the second region 304 of the cavity is at the lower end of the top mold 301 and the first region 303 of the cavity is directly connected to the second region of the cavity 304 as described above. The second region 304 of the cavity is open at the base of the top mold 301. The first region 303 of the cavity of the top mold 301 at least one slot as opening 305.

Figure 4:
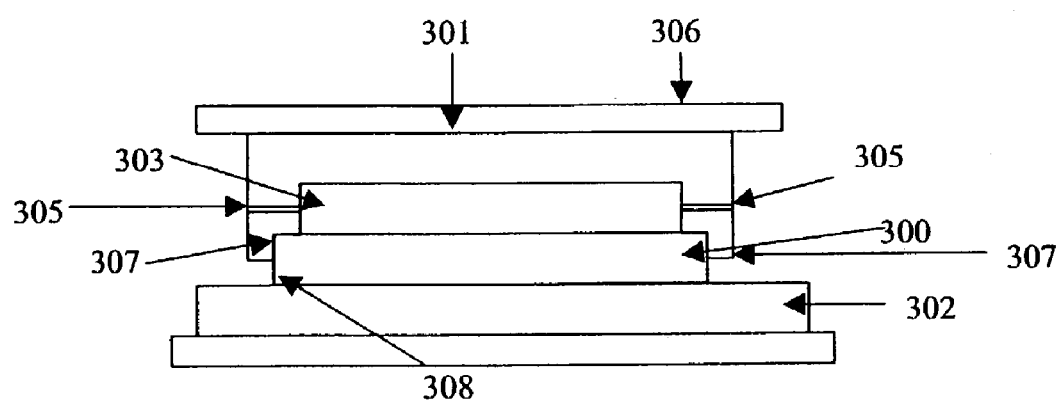
FIG. 4 shows the arrangement of FIG. 3 in the status when the substrate is fitted into the second region of the cavity of the top mold according to an embodiment of the invention.

In this embodiment of the invention, a substrate 300 to be encapsulated is placed onto a bottom mold 302 by a first placing unit (not shown). The top mold 301 is placed onto the substrate 300 by a second placing unit (not shown) such that the substrate 300 is fitted into the second region of the cavity 304 of the top mold 301 as shown in FIG. 4. In other words, the substrate is accommodated into the recess formed by the step-shaped cavity. Thus, the protrusion 307 of the recess is arranged circumferentially adjacent to the side surfaces of the substrate.

The length of the protrusion 307 of the second region of the cavity 304 is designed to be shorter than the thickness 308 of the substrate 300 with regard to the main surface of the substrate 300. Therefore, the substrate 300 protrudes from the second region 304 of the cavity of the top mold 301 by an amount which is equal to the difference between the thickness 308 of the substrate 300 and the length of the protrusion 307 of the second region 304 of the cavity.

Figure 5:
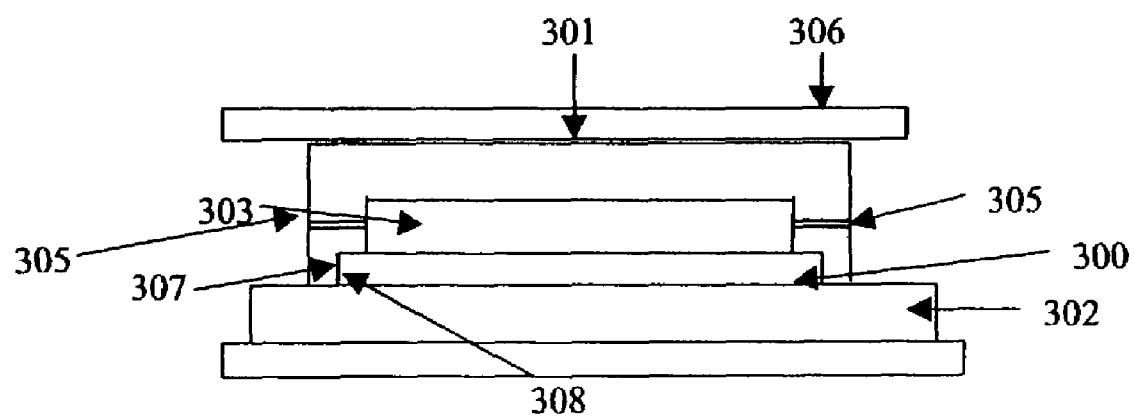
FIG. 5 shows the arrangement of FIG. 3 in the status when the maximum force is applied to the substrate according to an embodiment of the invention.

The top mold 301, the substrate 300 and the bottom mold 302 are clamped together and the clamping force is increased and the substrate 300 is thus compressed until the top mold 301 and the bottom mold 302 are abutted against each other as shown in FIG. 5.

According to another embodiment of the invention, a compliance material being deposited onto the inner surface of the cavity of the top mold 301 is provided to further absorb the clamping force exerted on the substrate 300 by the clamps 306 when a thicker substrate is to be encapsulated.

After the top mold 301, the substrate 300 and the bottom mold 302 have been clamped together, encapsulating material is injected into the first region 303 of the cavity of the top mold 301 through at least one slot 305 by an injecting unit for injecting an encapsulating material into the first region 303 of the cavity of the top mold 301. After the encapsulating material has settled in the entire first region of the cavity 303 of the top mold 301, the clamps 306 and the top mold 301 are removed by a removing unit (not shown) for removing the clamps 306 and the top mold 301 from the bottom mold 302 and the substrate 300, and the encapsulating material is cured so that it is hardened using a curing unit for curing the encapsulating material (not shown), and the encapsulation process of the substrate 300 is complete.

According to another embodiment of the invention, a top mold with a plurality of stepped cavities is used to encapsulate a plurality of substrates at the same time. According to this embodiment, a plurality of substrates are placed onto the bottom mold, and the top mold with a plurality of stepped cavities are placed on the substrates, such that each substrate is fitted into a respective second region of the stepped cavity of the top mold. The top mold, the substrates and the bottom mold are then clamped together and the encapsulating material is injected into a respective first region of the stepped cavity of the top mold. The clamps and the top mold are removed and all the encapsulating materials on each substrate are cured. Thus, a plurality of substrates are encapsulated with the encapsulating material at the same time.

While the embodiments of the invention have been described, they are merely illustrative of the principles of the invention. Other embodiments and configurations may be devised without departing from the spirit of the invention and the scope of the appended claims.

The invention claimed is:

1. A transfer mold for encapsulating a substrate with an encapsulating material comprising:
   a bottom mold;
   a top mold,
   wherein a space provided between the top mold and bottom mold receives the substrate; and
   the top mold and the bottom mold abutted against each other in the presence of a clamping force, thereby distributing the force exerted on the substrate to the top mold and bottom mold, wherein the bottom mold comprises a recess for receiving the substrate, thereby providing the space between the top mold and bottom mold, and wherein the recess is a channel which extends across the bottom mold.

2. The transfer molding arrangement according to claim 1 wherein the recess has the shape of a rectangular cavity.

3. A transfer mold comprising:
   a top mold including a cavity in communication with a reservoir; said reservoir for delivering encapsulating material to said cavity, said top mold further including air vents in said cavity; and
   a bottom mold having a shape of a channel extending along a length of said bottom mold, the length of said channel greater than a corresponding dimension of said cavity of said top mold, wherein said top and bottom molds define a space for receiving a substrate, and wherein said top and bottom molds are operable to exert maximum force upon said volume when said molds abut each other during a clamping operation.

4. The transfer mold of claim 3 wherein said bottom mold is interchangeable for use with a plurality of substrates with different lengths and widths.

5. The transfer mold of claim 3 wherein said top mold and said bottom mold define a plurality of additional spaces for receiving a plurality of substrates during a molding operation.

6. The transfer mold of claim 3 wherein said space for receiving said substrate is shallower than the thickness of said substrate, such that said clamping operation compresses said substrate.

7. The transfer mold of claim 3 wherein said channel extends across the length of said mold.

8. A transfer mold for encapsulating a substrate with an encapsulating material comprising:
   a bottom mold;
   a top mold,
   wherein a space provided between the top mold and bottom mold receives the substrate; and
   the top mold and the bottom mold abutted against each other in the presence of a clamping force, thereby distributing the force exerted on the substrate to the top mold and bottom mold, wherein said top mold has a stepped cavity comprising:
   a first region receiving an encapsulating material;
   a second region receiving the substrate; and
   at least one opening for injecting said encapsulating material into said first region of the stepped cavity when the substrate is received in said second region.

9. The transfer mold of claim 1, wherein said space is shallower than the thickness of said substrate.

10. The transfer mold of claim 1 further comprising an injecting unit for injecting an said encapsulating material into a cavity in the top mold through said at least one opening of the top mold.

11. The transfer mold of claim 10 further comprising a curing unit for curing the encapsulating material, thereby encapsulating said substrate.

* * * * *